US010328500B2

United States Patent
Morton et al.

(10) Patent No.: US 10,328,500 B2
(45) Date of Patent: Jun. 25, 2019

(54) CUTTING AND DEBURRING TOOL

(71) Applicant: Greenlee Textron Inc., Rockford, IL (US)

(72) Inventors: John Jeremiah Morton, Chattanooga, TN (US); Arthur Anton Piper, Loves Park, IL (US); Gerald Tully, Hampshire, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 0 days.

(21) Appl. No.: 15/668,323

(22) Filed: Aug. 3, 2017

(65) Prior Publication Data
US 2019/0039151 A1   Feb. 7, 2019

(51) Int. Cl.
| | |
|---|---|
| B23B 51/02 | (2006.01) |
| B23B 51/00 | (2006.01) |
| B23P 15/32 | (2006.01) |
| B24B 19/04 | (2006.01) |
| B23B 51/10 | (2006.01) |

(52) U.S. Cl.
CPC .......... *B23B 51/009* (2013.01); *B23B 51/101* (2013.01); *B23P 15/32* (2013.01); *B24B 19/04* (2013.01)

(58) Field of Classification Search
CPC ............ B23B 51/009; B23B 2251/282; B23B 2251/70; B23B 2251/40; B23B 2251/52
See application file for complete search history.

(56) References Cited

U.S. PATENT DOCUMENTS

| | | | | |
|---|---|---|---|---|
| 499,098 A | * | 6/1893 | Comstock | B23B 51/108 408/224 |
| 2,610,530 A | * | 9/1952 | Caliendo | B23B 5/163 408/104 |

(Continued)

FOREIGN PATENT DOCUMENTS

| | | | | |
|---|---|---|---|---|
| CN | 201151004 Y | 11/2008 | | |
| DE | 4010075 A1 | * 10/1991 | .......... | B23B 51/108 |

(Continued)

OTHER PUBLICATIONS

JP 2002-28811 Machine Translation, pp. 3-6, Jun. 5, 2018.*

(Continued)

*Primary Examiner* — Nicole N Ramos
(74) *Attorney, Agent, or Firm* — Klintworth & Rozenblat IP LLP

(57) ABSTRACT

A cutting and deburring tool according to some embodiments of the disclosure includes a body portion configured to cut a hole in the workpiece, and a workpiece engaging portion and a shaft extending therefrom. The body portion includes a cutting edge configured to cut a hole in a workpiece and deburring cutting edges configured to deburr a first edge of a hole of a workpiece when the body portion is rotated in a clockwise direction or in a counter-clockwise direction after the hole is cut by the body portion. In some embodiments, a second body portion is provided and includes deburring cutting edges configured to deburr a second, opposite edge of the hole when the body portions are rotated in rotated in the clockwise direction or the counter-clockwise direction after the hole is cut by the first body portion.

22 Claims, 11 Drawing Sheets

(56) References Cited

U.S. PATENT DOCUMENTS

| | | | | |
|---|---|---|---|---|
| 2,694,321 | A | * | 11/1954 | Riza ............... B23B 5/168 408/154 |
| 3,559,514 | A | * | 2/1971 | Brownfield ........ B23D 77/12 408/205 |
| 3,645,640 | A | * | 2/1972 | Zukas ............... B23B 5/16 408/192 |
| 4,580,933 | A | * | 4/1986 | Wilkins ........... B23B 51/108 408/118 |
| 4,582,458 | A | * | 4/1986 | Korb ............... B23B 51/009 408/224 |
| 5,174,692 | A | * | 12/1992 | Martin ............ B23B 51/0081 408/56 |
| 5,186,584 | A | * | 2/1993 | Muller ............. B23B 51/02 408/224 |
| 5,466,100 | A | | 11/1995 | Ahluwalia |
| 7,150,589 | B2 | | 12/2006 | Nordlin |
| 7,278,806 | B1 | * | 10/2007 | Clayton ............ B23C 3/12 144/347 |
| 8,029,215 | B2 | | 10/2011 | Gentry et al. |
| 8,388,280 | B1 | | 3/2013 | Ison et al. |
| 2004/0076483 | A1 | | 4/2004 | Singh et al. |
| 2006/0140732 | A1 | * | 6/2006 | Hecht ............. B23B 27/141 408/199 |
| 2007/0264094 | A1 | | 11/2007 | Seeley |
| 2008/0029311 | A1 | | 2/2008 | Seeley |
| 2008/0166195 | A1 | | 7/2008 | Gentry et al. |
| 2010/0254779 | A1 | * | 10/2010 | Wedner ........... B23B 51/009 408/224 |
| 2011/0164937 | A1 | | 7/2011 | Byrne et al. |
| 2014/0363244 | A1 | | 12/2014 | Allen et al. |
| 2014/0369776 | A1 | | 12/2014 | Durfee |
| 2015/0093205 | A1 | * | 4/2015 | Krenzer ........... B23B 51/009 408/1 R |

FOREIGN PATENT DOCUMENTS

| | | | |
|---|---|---|---|
| DE | 29803261 | | 4/1998 |
| DE | 29703475 | | 5/1998 |
| DE | 20303656 | | 6/2003 |
| GB | 155004 | | 12/1920 |
| GB | 2490955 | | 11/2012 |
| JP | 2002028811 A | * | 1/2002 |
| JP | 2002103127 A | * | 4/2002 |

OTHER PUBLICATIONS

"Cutting-Edge Product Developments," EXACT GmbH & Co. KG Prazisionswerkzeuge, http://exact.info/english/stufenbohrer.php, 2014, 1 page.
Bit,Step 32,5MM (PKGD)—Greenlee—Faster, Safer, Easier@ 783310360223, 2017, 1 pg.
English translation of CN201151004Y.
English translation of DE20303656U1.
Extended European Search Report for corresponding European Application No. 18186781.3 dated Feb. 4, 2019, 8 pages.
Machine translation for DE29703475.
Machine translation for DE29803261.

\* cited by examiner

CUTTING AND DEBURRING TOOL

FIELD OF THE DISCLOSURE

The present disclosure relates to a cutting and deburring tool configured to cut a hole in a workpiece and to deburr at least one edge of the hole.

BACKGROUND

Holes can be made in a workpiece, for example, sheet metal using a punch, hole saw, or a high-speed cutter. As a result of forming such holes, sharp edges and/or burrs are left on the workpiece around the circumference of the hole. These sharp edges can be hazardous. For example, when assembling switches, push buttons, or conduit connectors, the sharp edges can cut an assembler's hands. In addition, the burrs can be problematic when assembling accessories to the workpiece. The burrs prevent the accessory from lying flat against the surface of the workpiece and therefore cause an undesirable appearance. In addition, when the accessory does not lay flat against the surface, an oil tight and dust proof fit is not provided.

When electrical panels are formed, panel openings may be hand filed or by using a cutting and deburring tool. One such example of a deburring tool is shown in U.S. Pat. No. 7,146,549.

SUMMARY

A cutting and deburring tool according to some embodiments of the disclosure includes a body portion configured to cut a hole in the workpiece, and a workpiece engaging portion and a shaft extending therefrom. The body portion includes a cutting edge configured to cut a hole in a workpiece and deburring cutting edges configured to deburr a first edge of a hole of a workpiece when the body portion is rotated in a clockwise direction or in a counter-clockwise direction after the hole is cut by the body portion. In some embodiments, a second body portion is provided and includes deburring cutting edges configured to deburr a second, opposite edge of the hole when the body portions are rotated in rotated in the clockwise direction or in the counter-clockwise direction after the hole is cut by the first body portion.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
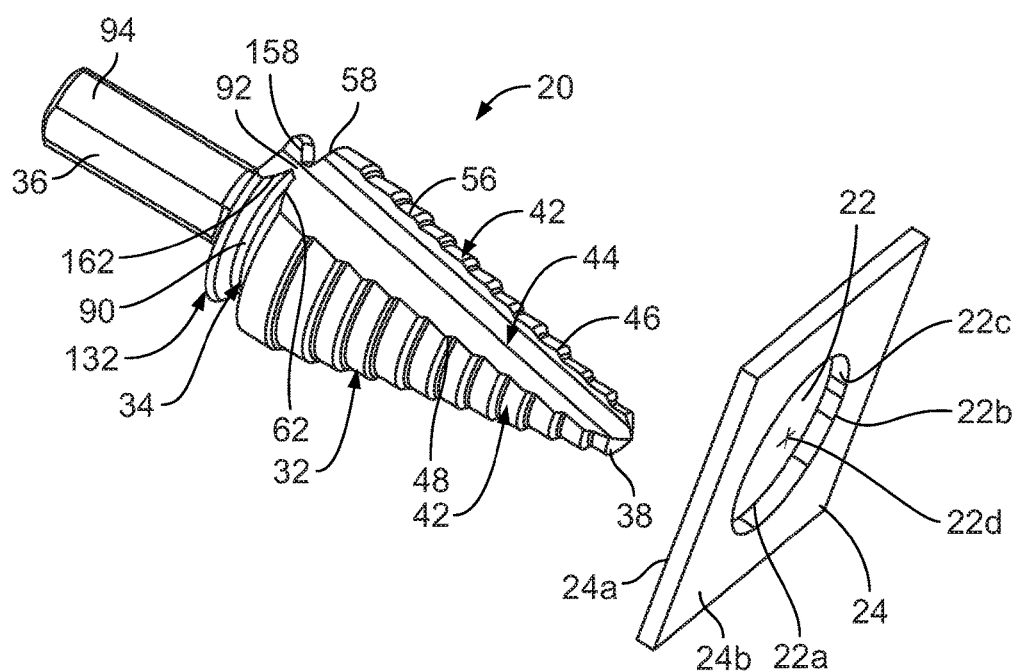
FIG. 1 is a perspective view of a cutting and deburring tool and a workpiece to be cut and deburred by the cutting and deburring tool.
Figure 2:
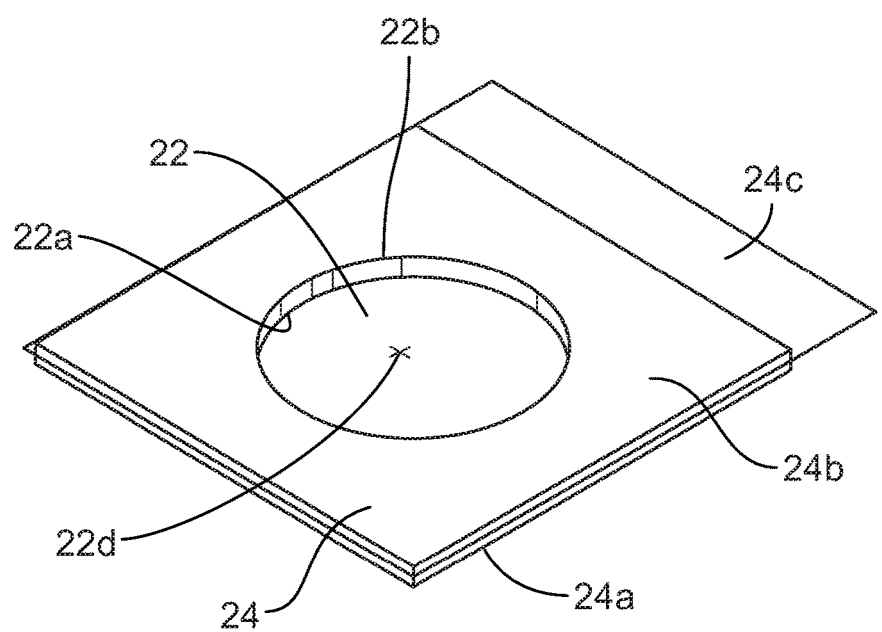
FIG. 2 is a perspective view of a workpiece.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A cutting and deburring tool 20 is provided. As will be described herein, the cutting and deburring tool 20 is configured to be mounted within the chuck of a power tool (not shown), such as an electric drill, to provide rotation of the cutting and deburring tool 20 to cut and deburr a hole 22 in a workpiece 24. The cutting and deburring tool 20 is any axially fed rotary hole making tool. In some embodiments, the cutting and deburring tool 20 is formed of steel. In an embodiment, the cutting and deburring tool 20 is a step bit as shown in the drawings. In an embodiment, the cutting and deburring tool 20 is a twist drill. In an embodiment, the cutting and deburring tool 20 is a reamer. In an embodiment, the cutting and deburring tool 20 is a combination drill and reamer.

The workpiece 24 has a first side 24a and an opposite second side 24b through which the hole 22 is formed; and a center plane 24c of the workpiece 24 is defined by a plane which extends through the workpiece 24 in a direction perpendicular to an axial centerline 22d of the hole 22. In some embodiments, the workpiece 24 is formed of sheet steel. In some embodiments, the workpiece 24 has planar sides 24a, 24b.

A front end of the cutting and deburring tool 20 is shown at reference numeral 26; a rear end of the cutting and deburring tool 20 is shown at reference numeral 28 and a length of the cutting and deburring tool 20 is defined therebetween. For the purposes of reference and ease of discussion, the end 26 of the cutting and deburring tool 20 which first contacts the workpiece 24 is referred to as the front or forward end of the cutting and deburring tool 20 and the end 28 of the cutting and deburring tool 20 which is received by the power tool is referred to as the back or rear, or rearward end of the cutting and deburring tool 20. A central axis 30 extends from the front end 26 to the rear end 28, and the cutting and deburring tool 20 rotates around the central axis 30.

In an embodiment, the cutting and deburring tool 20 includes a front body portion 32 and a rear body portion 132 which are separated from each other by a workpiece engaging portion 34, and a shaft 36 extending rearwardly from the rear body portion 132.

The front body portion 32 extends from a tip 38 at the front end 26 to a rear end 40. In an embodiment, the front body portion 32 is generally conically-shaped. The tip 38 has cutting edges to form a hole in the workpiece 24.

The front body portion 32 has body sections 42 alternating with flutes 44 around a circumference of the cutting and deburring tool 20, such that the body sections 42 extend partially around the circumference and the flutes 44 extend partially around the circumference. Each body section 42 and flute 44 extends from the tip 38 to the rear end 40. Each flute 44 includes edges 46, 48 and surfaces 50, 52 which extend from the tip 38 to the rear end 40. The surfaces 50, 52 meet at a meeting line 54. Surface 50 extends from edge 46 to the meeting line 54, and surface 52 extends from edge 48 to the meeting line 54. In an embodiment, the surfaces 50, 52 form a generally V-shaped channel. In an embodiment, the surface 50 has an inner section 50a which is curved and an outer section 50b which is planar. The surface 52 is planar.

The edge 46 of each flute 44 defines a portion which forms a hole cutting edge 56 which extends from the tip 38 toward the rear end 40 along the majority of the length of the front body portion 32, and a portion which forms a deburring cutting edge 58 extending from the cutting edge 56 to the rear end 40 of the front body portion 32. The edge 48 of each flute 44 defines a portion which forms an edge 60 which extends from the tip 38 toward the rear end 40 along the majority of the length of the front body portion 32, and a portion which forms a deburring cutting edge 62 extending from the edge 60 to the rear end 40 of the front body portion 32. The cutting edge 56 is configured to cut the hole 22 in the workpiece 24, and the deburring cutting edges 58, 62 deburr a forward edge 22b of the hole 22 of the workpiece 24 after the workpiece 24 has been cut by the tip 38 and the cutting edge 56.

In some embodiments, each body section 42 includes a plurality of steps 64. The steps 64 are axially stacked and progressively sized along the front body portion 32. The steps 64 are axially stacked in that the steps 64 are coaxially arranged along the central axis 30. In addition, the steps 64 are progressively sized in that the steps 64 incrementally increase in size (e.g., diameter) from the tip 38 to the rear ends of the edges 56, 60. In some embodiment, each steps 64 includes an axial relief, a diametral relief, and a radial relief. In some embodiments, the diametral relief may be omitted (i.e., may be 0 degrees). In some embodiments, a step chamfer 66 is formed between each pair of adjacent steps 64 to connect the adjacent steps 64 at an angle to provide a smooth transition therebetween. The step chamfers 66 may be omitted.

Figure 6:
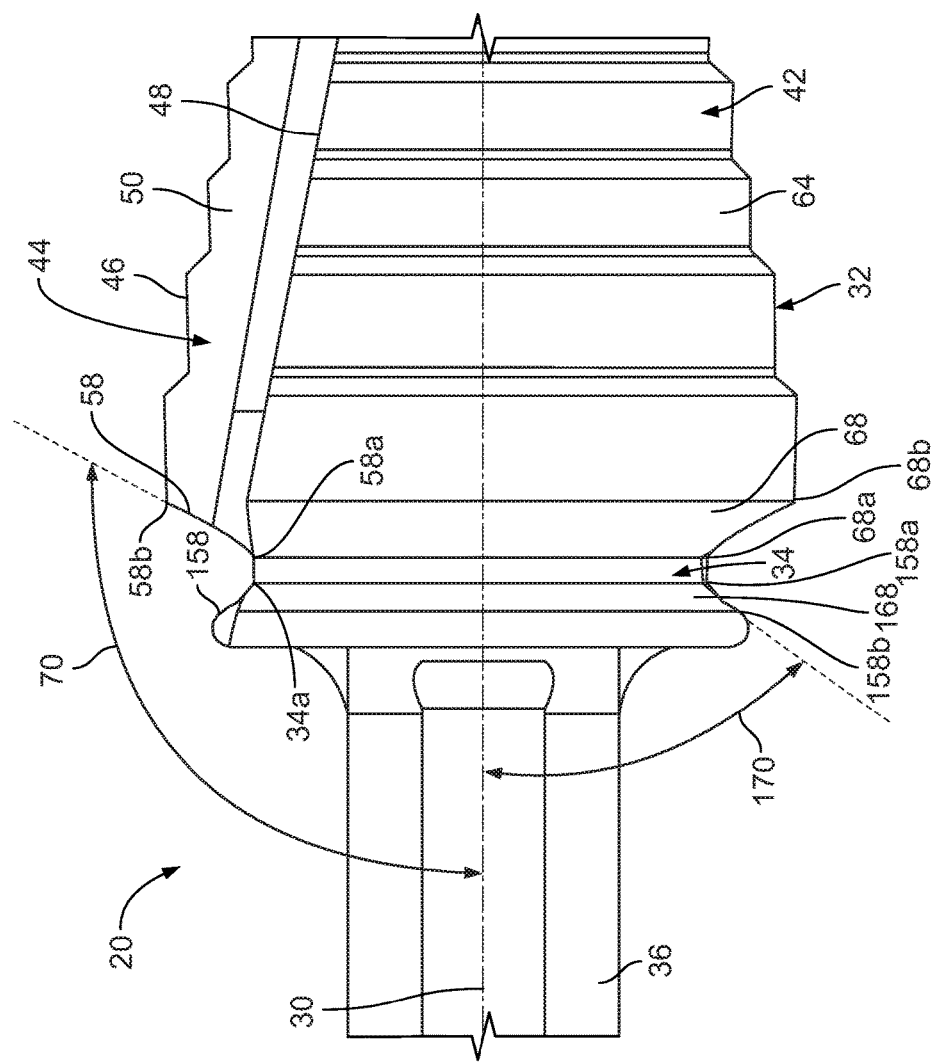
FIG. 6 is a partial side elevation view of the cutting and deburring tool.

A deburring guide surface 68 extends between the first deburring cutting edge 58 and the second deburring cutting edge 62 of each body section 42. As shown in FIG. 6, the deburring guide surface 68 extends at an angle 70 relative to the central axis 30 and extends in a generally axial direction between a first end 68a of the deburring guide surface 68 and a second end 68b of the deburring guide surface 68. In some embodiments, the angle 70 is between approximately 110 degrees to approximately 130 degrees. In an embodiment, the deburring guide surface 68 extends at an angle 70 of 120 degrees. In some embodiments, each deburring guide surface 68 has a radius that is constant as the deburring guide surface 68 extends around the circumference of the cutting and deburring tool 20. In some embodiments, each deburring guide surface 68 is relieved by a radial relief angle such that the radius of the deburring guide surface 68 decreases as the deburring guide surface 68 moves away from one of the deburring cutting edges 58, 62. In some embodiments, the angle forming the radial relief angle of the deburring guide surface 68 is between approximately 3 degrees and approximately 13 degrees. In some embodiments, the angle forming the radial relief angle of the deburring guide surface 68 is 8 degrees.

Figure 3:
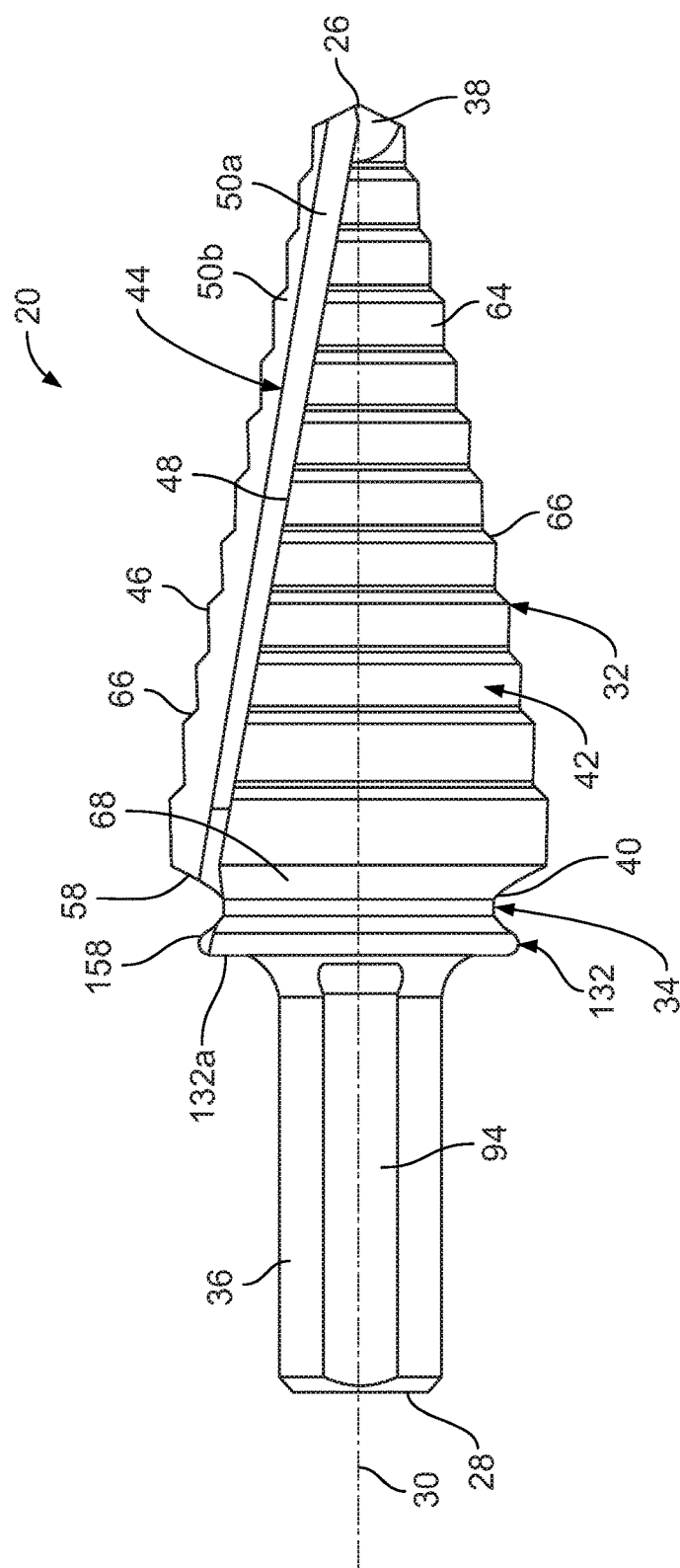
FIG. 3 is a side elevation view of the cutting and deburring tool of FIG. 1.
Figure 5:
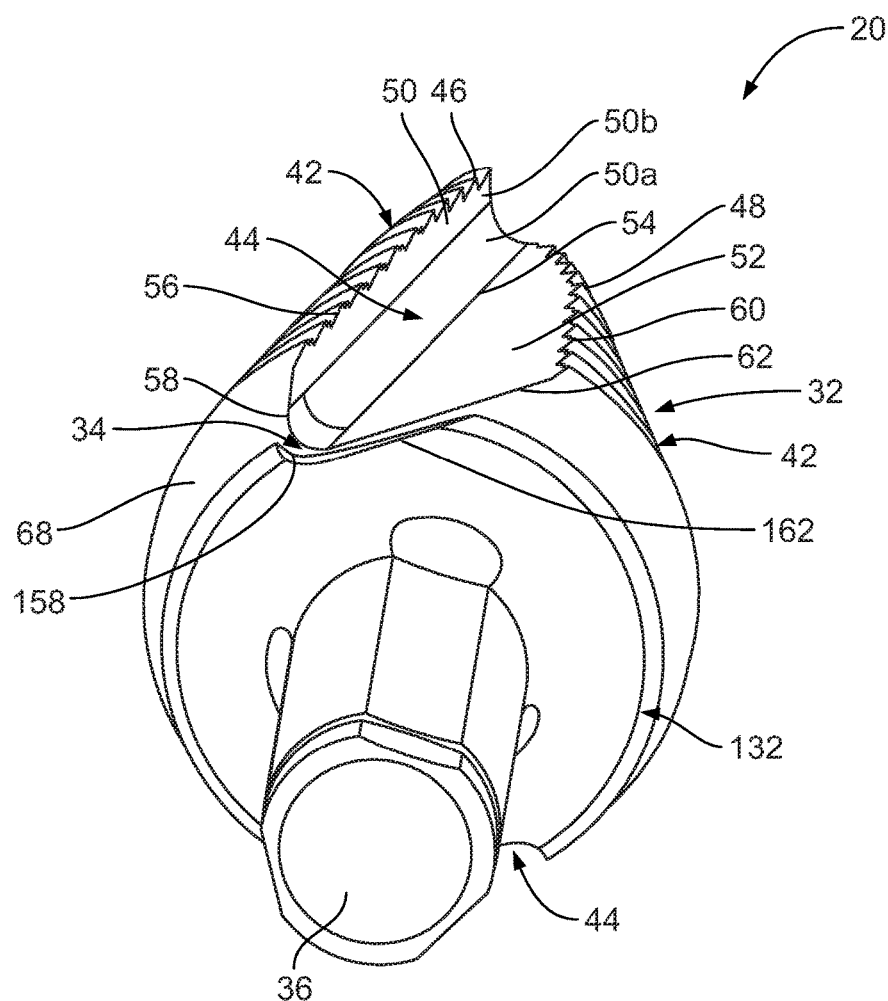
FIG. 5 is a rear perspective view of the cutting and deburring tool.

The first deburring cutting edge 58 is formed between the flute surface 50 and the deburring guide surface 68 of each body section 42. The first deburring cutting edge 58 deburrs the forward edge 22b of the hole 22 of the workpiece 24 when the cutting and deburring tool 20 is rotated in a clockwise direction when viewed from the rear end 28 of the cutting and deburring tool 20 and after the workpiece 24 has been cut by the tip 38 and the cutting edge 56. As shown in FIG. 6, the first deburring cutting edge 58 includes an inner end 58a which is spaced radially outwardly from the central axis 30 by a first distance and an outer end 58b which is spaced radially outwardly from the central axis 30 by a second distance, the second distance being greater than the first distance. The inner end 58a is proximate to a front end 34b of the workpiece engaging portion 34, and the outer end 58b is spaced forwardly from the front end 34b of the workpiece engaging portion 34 and the first deburring cutting edge 58 extends in a generally axial direction. When the first deburring cutting edge 58 is viewed in elevation as shown in FIGS. 3 and 6, the first deburring cutting edge 58 is linear; when viewed from the end view as shown in FIG. 5, the first deburring cutting edge 58 is curved.

Figure 4:
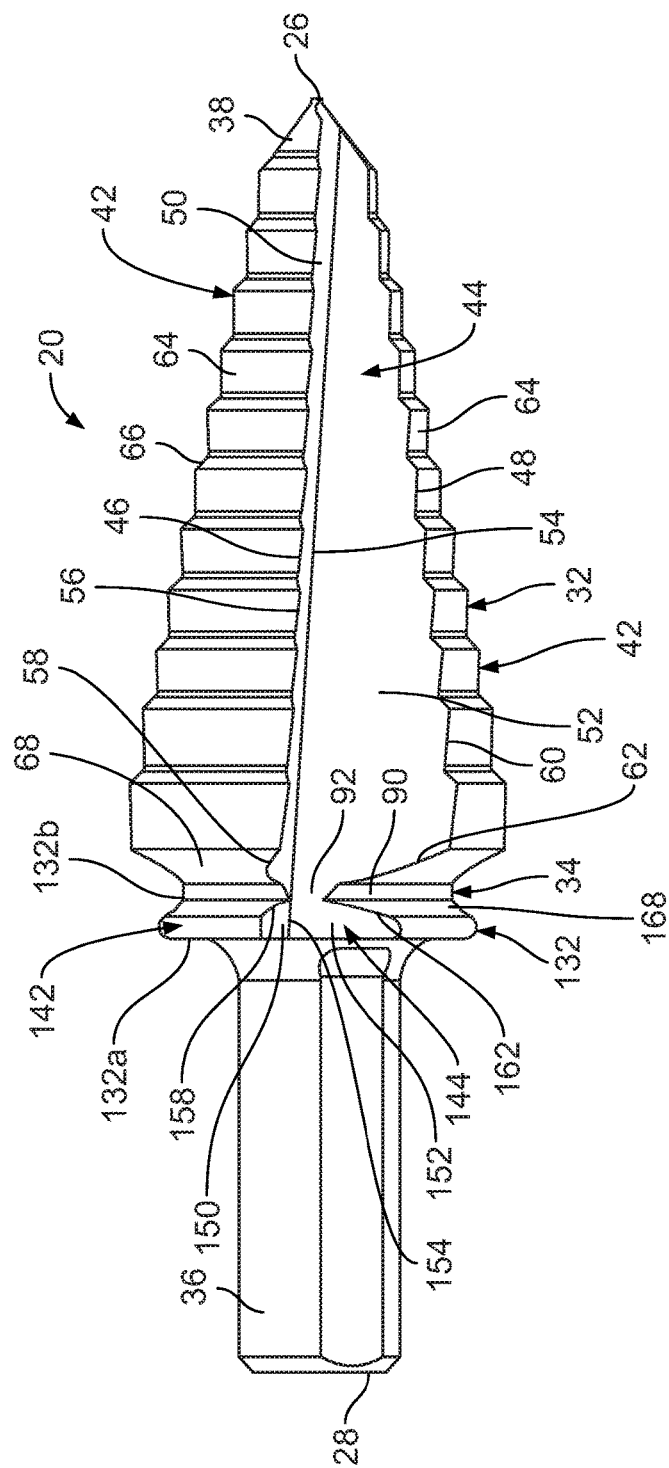
FIG. 4 is a side elevation view of the cutting and deburring tool from another orientation.
Figure 7:
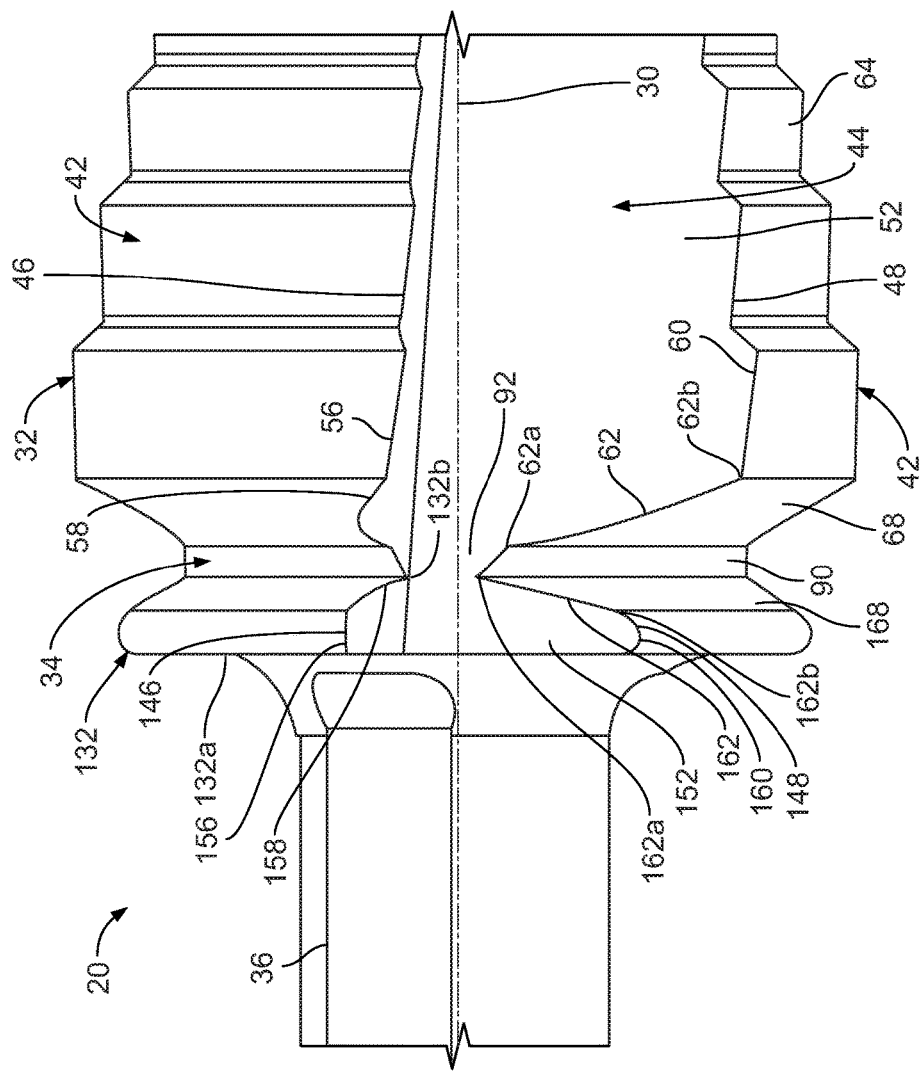
FIG. 7 is a partial side elevation view of the cutting and deburring tool from another orientation.

The second deburring cutting edge 62 is formed between the flute surface 52 and the deburring guide surface 68. The second deburring cutting edge 62 deburrs the forward edge 22b of the hole 22 of the workpiece 24 when the cutting and deburring tool 20 is rotated in a counter-clockwise direction when viewed from the rear end 28 of the cutting and deburring tool 20 and after the workpiece 24 has been cut by the tip 38 and the cutting edge 56. The second deburring cutting edge 62 includes an inner end 62a which is spaced radially outwardly from the central axis 30 by a first distance and an outer end 62b which is spaced radially outwardly from the central axis 30 by a second distance, the second distance being greater than the first distance. The inner end 62a is proximate to the front end 34b of the workpiece engaging portion 34, and the outer end 62b is spaced forwardly from the front end 34b of the workpiece engaging portion 34 and the second deburring cutting edge 62 extends in a generally axial direction. When the second deburring cutting edge 62 is viewed in elevation as shown in FIGS. 4 and 7, the second deburring cutting edge 62 is linear; when viewed from the end view as shown in FIG. 5, the second deburring cutting edge 62 is linear.

The rear body portion 132 has body sections 142 alternating with flutes 144 around a circumference of the cutting and deburring tool 20, such that the body sections 142 extend partially around the circumference and the flutes 144 extend partially around the circumference. In some embodiments, the flutes 144 of the rear body portion 132 align with a respective flute 44 of the front body portion 32.

Each flute 144 extends from a rear end 132a of the rear body portion 132 to a front end 132b of the rear body portion 132. Each flute 144 includes edges 146, 148 and surfaces 150, 152 which extend from the rear end 132a to the front end 132b. The surfaces 150, 152 meet at a meeting line 154. Surface 150 extends from edge 146 to the meeting line 154, and surface 152 extends from edge 148 to the meeting line 154. In an embodiment, the surfaces 150, 152 form a generally V-shaped channel. In an embodiment, the surface 150 is curved and the surface 152 is planar.

The edge 146 of each flute 144 defines an edge 156 which extends from the rear end 132a toward the front end 132b along a portion of the length of the rear body portion 132, and a deburring cutting edge 158 extending from the edge 156 to the front end 132b of the rear body portion 132. The edge 148 of each flute 144 defines an edge 160 which extends from the rear end 132a toward the front end 132b along a portion the length of the rear body portion 132, and a deburring cutting edge 162 extending from the edge 160 to the front end 132b of the rear body portion 132. The deburring cutting edges 158, 162 deburr a rearward edge 22a of the hole 22 of the workpiece 24 after the workpiece 24 has been cut by the cutting edge 56.

A deburring guide surface 168 extends between the first deburring cutting edge 158 and the second deburring cutting edge 162 of each body section 142. As shown in FIG. 6, the deburring guide surface 168 extends at an angle 170 relative to the central axis 30 and extends in an axial direction between a first end 168a of the deburring guide surface 168 and a second end 168b of the deburring guide surface 168. In some embodiments, the angle 170 is between approximately 46 degrees and approximately 70 degrees. In an embodiment, the angle 170 is 60 degrees. In some embodiments, each deburring guide surface 168 has a radius that is constant as the deburring guide surface 168 extends around the circumference of the cutting and deburring tool 20. In some embodiments, each deburring guide surface 168 is relieved by a radial relief angle such that the radius of the deburring guide surface 168 decreases as the deburring guide surface 168 moves away from one of the deburring cutting edges 158, 162. In some embodiments, the angle forming the radial relief angle of the deburring guide surface 168 is between approximately 3 degrees and approximately 13 degrees. In an embodiment, the angle forming the radial relief angle of the deburring guide surface 168 is 8 degrees.

The first deburring cutting edge 158 is formed between the flute surface 150 and the deburring guide surface 168. The first deburring cutting edge 158 deburrs the rearward edge 22a of the hole 22 of the workpiece 24 when the cutting and deburring tool 20 is rotated in a clockwise direction when viewed from the rear end 28 of the cutting and deburring tool 20 and after the workpiece 24 has been cut by the tip 38 and the cutting edge 56. The first deburring cutting edge 158 includes an inner end 158a which is spaced radially outwardly from the central axis 30 by a first distance and an outer end 158b which is spaced radially outwardly from the central axis 30 by a second distance, the second distance being greater than the first distance. The inner end 158a is proximate to a rear end 34a of the workpiece engaging portion 34, and the outer end 158b is spaced rearwardly from the rear end 34a of the workpiece engaging portion 34 and the first deburring cutting edge 158 extends in a generally axial direction. When the first deburring cutting edge 158 is viewed in elevation as shown in FIG. 3, the first deburring cutting edge 158 is linear; when viewed from the end view as shown in FIG. 6, the first deburring cutting edge 158 is curved.

The second deburring cutting edge 162 is formed between the flute surface 152 and the deburring guide surface 168. The second deburring cutting edge 162 deburrs the rearward edge 22a of the hole 22 of the workpiece 24 when the cutting and deburring tool 20 is rotated in a counter-clockwise direction when viewed from the rear end 28 of the cutting and deburring tool 20 and after the workpiece 24 has been cut by the tip 38 and the cutting edge 56. The second deburring cutting edge 162 includes an inner end 162a which is spaced radially outwardly from the central axis 30 by a first distance and an outer end 162b which is spaced radially outwardly from the central axis 30 by a second distance, the second distance being greater than the first distance. The inner end 162a is proximate to the rear end 34a of the workpiece engaging portion 34, and the outer end 162b is spaced rearwardly from the rear end 34a of the workpiece engaging portion 34 and the second deburring cutting edge 162 extends in a generally axial direction. When the second deburring cutting edge 162 is viewed in elevation as shown in FIG. 4, the second deburring cutting edge 162 is linear; when viewed from the end view as shown in FIG. 5, the second deburring cutting edge 162 is linear.

Figure 8:
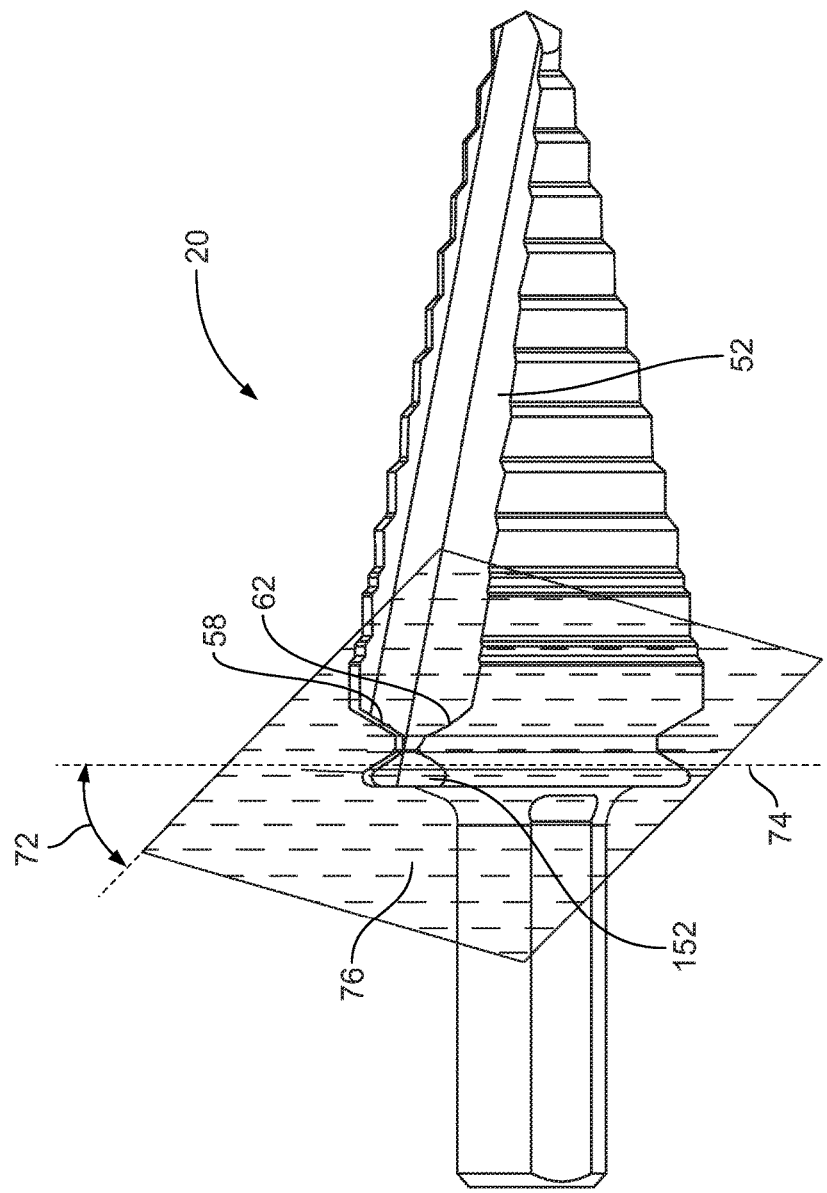
FIG. 8 is a side elevation view of the cutting and deburring tool showing a first axial rake angle of the cutting and deburring tool.

As shown in FIG. 8, each deburring cutting edge 58, 158 is defined by an axial rake angle 72 which is defined by the angle formed between a plane 74 and a plane 76. Plane 74 is defined as a plane which is parallel to the center plane 24c of the workpiece 24 that intersects the opposing deburring cutting edges 58, 158 (on both sides of the deburring and cutting tool 20). Plane 76 is defined as a plane which is perpendicular to surfaces 52, 152 of the flutes 44, 144. The axial rake angle 72 defined by the deburring cutting edge 58 is positive and the axial rake angle 72 defined by the deburring cutting edge 158 is negative. In some embodiments, the axial rake angle 72 is between approximately 20 degrees and approximately 60 degrees. In an embodiment, the axial rake angle 72 is 16 degrees.

Figure 9:
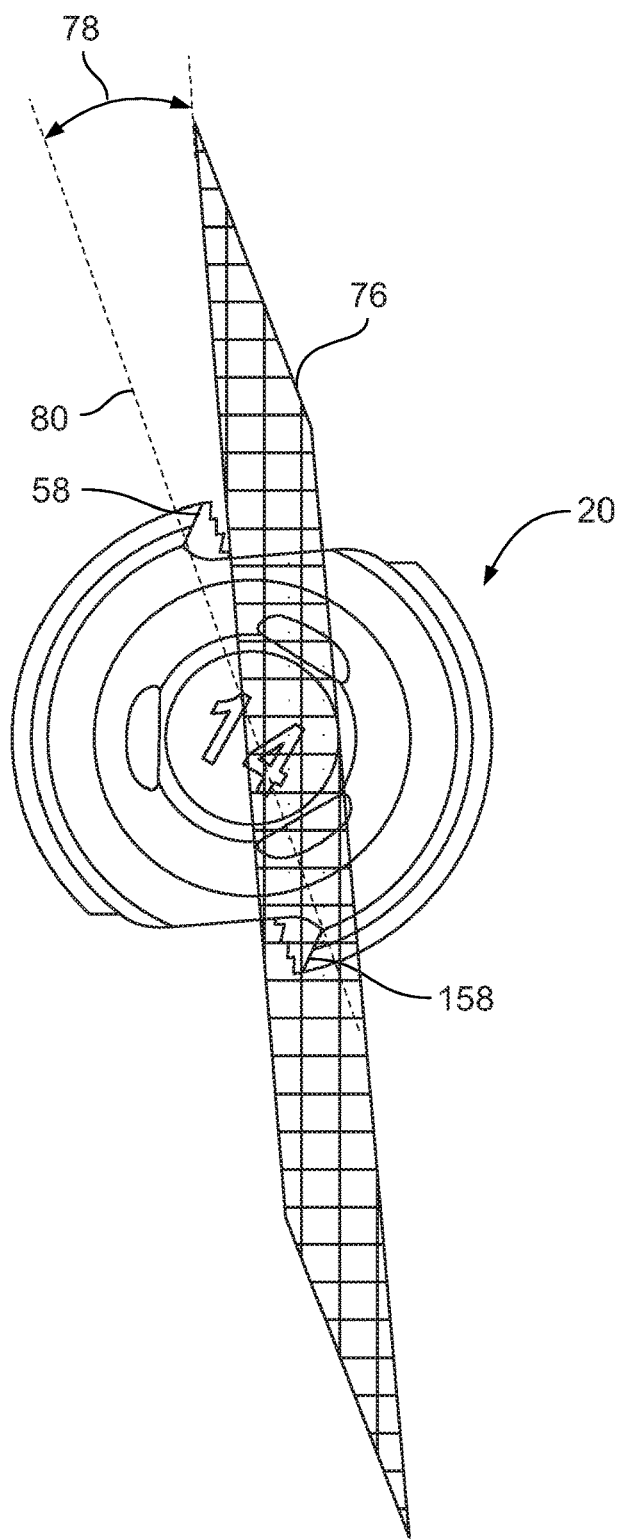
FIG. 9 is an end view of the cutting and deburring tool showing a first radial rake angle of the cutting and deburring tool.

As shown in FIG. 9, each deburring cutting edge 58, 158 is defined by a radial rake angle 78 which is the angle between a plane 80 and plane 76. Plane 80 is defined by a plane which is perpendicular to the center plane 24c of the workpiece 24 that intersects the opposing deburring cutting edges 58, 158 (on both side of the deburring and cutting tool 20). In some embodiments, the radial rake angle 78 is between approximately 10 degrees and approximately 35 degrees. In an embodiment, the radial rake angle 78 is 16 degrees. The radial rake angle 78 is constant along the length of the respective flute 44, 144 such that edges 46, 146 are defined by the same radial rake angle 78.

Figure 10:
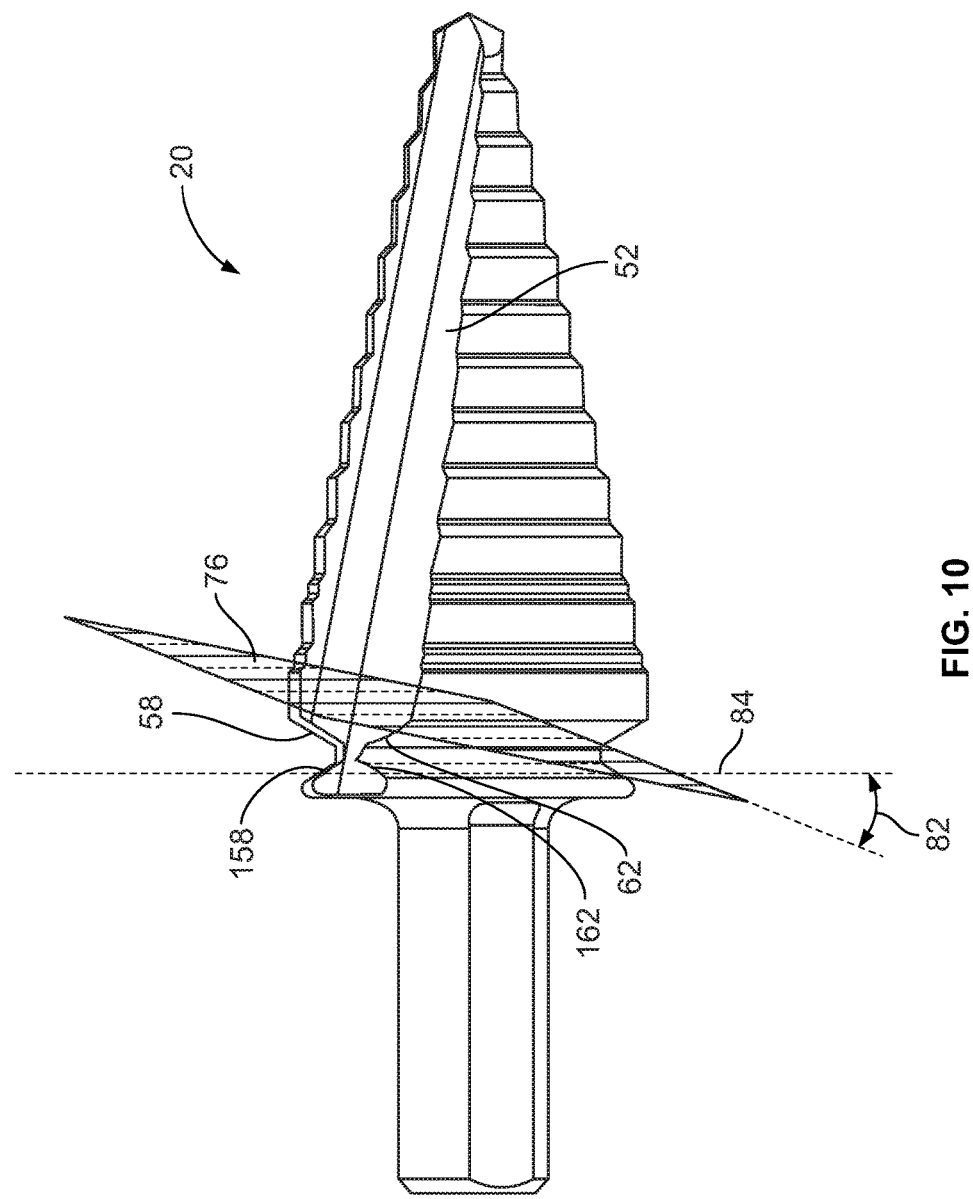
FIG. 10 is a side elevation view of the cutting and deburring tool showing a second axial rake angle of the cutting and deburring tool.

As shown in FIG. 10, each deburring cutting edge 62, 162 is defined by an axial rake angle 82 which is defined by the angle formed between a plane 84 and plane 76. Plane 84 is defined by a plane which is parallel to the plane which extends through the workpiece 24 in a direction perpendicular to the axial centerline 22d of the workpiece 24 that passes through opposing deburring cutting edges 62, 162 (on both sides of the deburring and cutting tool 20). The axial rake angle 82 defined by the deburring cutting edge 62 is positive and the axial rake angle 82 defined by the deburring cutting edge 162 is negative. In some embodiments, the axial rake angle 82 is between approximately 20 degrees and approximately 60 degrees. In an embodiment, the axial rake angle 82 is 16 degrees.

Figure 11:
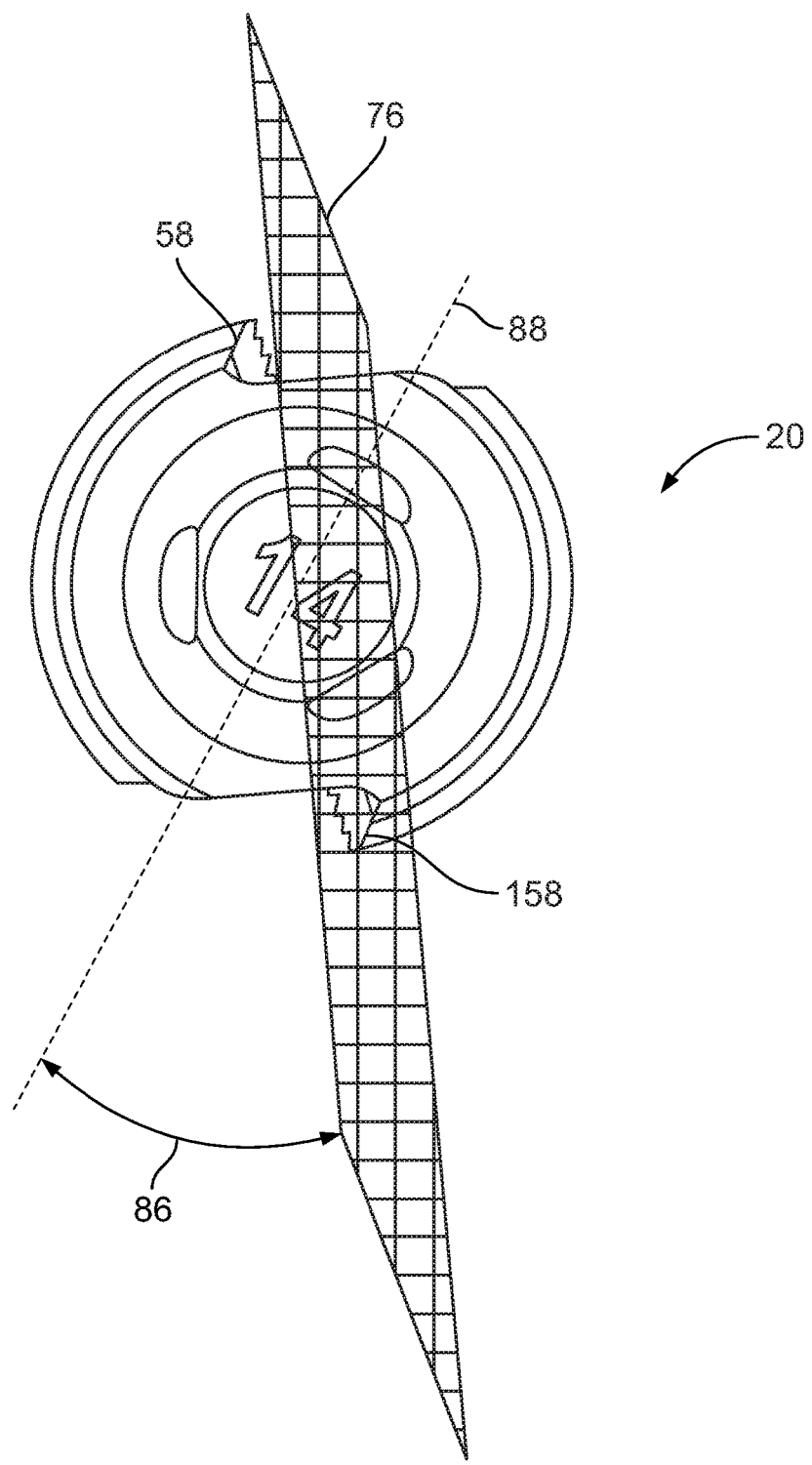
FIG. 11 is an end view of the cutting and deburring tool showing a second radial rake angle of the cutting and deburring tool.

As shown in FIG. 11, each deburring cutting edge 62, 162 is defined by a radial rake angle 86 which is the angle between a plane 88 and plane 76. Plane 88 is defined by a plane which is perpendicular to the plane which extends through the workpiece 24 in a direction perpendicular to the axial centerline 22d of the workpiece 24 that passes through the opposing deburring cutting edges 62, 162 (on both sides of the deburring and cutting tool 20). In some embodiments, the radial rake angle 86 is between approximately 10 degrees and approximately 30 degrees. In an embodiment, the radial rake angle 86 is 34 degrees. The radial rake angle 86 is constant along the length of the respective flute 44, 144 such that edges 48, 148 are defined by the same radial rake angle 86.

As shown in FIG. 4, the workpiece engaging portion 34 defines a diameter which is less than a diameter defined by each of the body portions 32, 132 at the ends 40, 132b, thereby forming a pocket between the body portions 32, 132. In some embodiments, the workpiece engaging portion 34 is cylindrical. In some embodiments, the workpiece engaging portion 34 has cylindrical body sections 90 which are interrupted by planar sections 92. The body sections 90 extend partially around the circumference and the planar sections 92 extend partially around the circumference. Each planar section 92 extends from the rear end 34a of the workpiece engaging portion 34 to the front end 34b of the workpiece engaging portion 34. In some embodiments, the planar sections 92 align with a respective flute 44 of the front body portion 32 and a respective flute 144 of the rear body portion 132.

The shaft 36 extends from the rear end 132a of the rear body portion 132. In an embodiment, flats 94 are provided on the shaft 36 and provide driving surfaces for rotation of the cutting and deburring tool 20 when mounted within the chuck of the power tool.

In an embodiment, two of each of the front body sections 42, flutes 44, rear body sections 142, and flutes 144 are provided. It is to be understood that a single one of the front body sections 42, flutes 44, rear body sections 142, flutes 144 may be provided, or more than two of the front body sections 42, flutes 44, rear body sections 142, flutes 144 may be provided. If two of the front body sections 42, flutes 44, rear body sections 142, flutes 144 are provided, the front body sections 42 may be disposed on diametrically opposed sides of the central axis 30 and the rear body sections 142 may be disposed on diametrically opposed sides of the central axis 30. In some embodiments, each body section 44, 144 extends around slightly less than half of the circumference.

In an embodiment, the flutes 44, 144 extend in a helix as the flutes 44, 144 extend through the cutting and deburring tool 20. In an embodiment, a central axis of the flutes 44, 144 extends at a constant angle relative to the central axis 30 of the deburring and cutting tool 20.

In an embodiment, the flutes 44, 144 of the cutting and deburring tool 20 are formed by machining a blank in a continuous motion. In some embodiments, the machining is performed by using a milling tool (not shown). In some embodiments, the machining is performed by using a grinding tool (not shown). The deburring guide surfaces 64, 164 may be formed by machining, such as by grinding or by turning.

To use the cutting and deburring tool 20, the user begins by engaging the shaft 36 within the chuck of the power tool. The user then engages the tip 38 with a rearward side of the workpiece 24 and the cutting and deburring tool 20 is rotated by the power tool. The tip 38 punctures the workpiece 24 and the cutting edge 56 of the front body portion 32 forms the hole 22 through the workpiece 24.

To deburr the edges 22a, 22b of the hole 22, the inside edge 22c (the area of the hole 22 between the rearward edge 22a of the hole 22 and the forward edge 22b of the hole 22) is placed proximate to the workpiece engaging portion 34. Rotation is then provided to the cutting and deburring tool 20 through the power tool.

The workpiece engaging portion 34 is pressed against the inside edge 22c of the hole 22 of the workpiece 24 while the cutting and deburring tool 20 is rotating in the clockwise direction relative to the workpiece 24. As the cutting and deburring tool 20 rotates in the clockwise direction, the first deburring cutting edge 58 on each body section 42 repeatedly engages with the forward edge 22b of the hole 22 in the workpiece 24 to deburr the forward edge 22b of the hole 22 by cutting away the sharp edges and/or burrs while spinning against the workpiece 24, and the first deburring cutting edge 158 of each body section 142 repeatedly engages with the rearward edge 22a of the hole 22 in the workpiece 24 to deburr the rearward edge 22a of the hole 22 by cutting away the sharp edges and/or burrs while spinning against the workpiece 24. When rotating in the clockwise direction, the first deburring cutting edges 58 provide a positive axial rake angle 72 and a positive radial rake angle 78, and the first deburring cutting edges 158 provide a positive axial rake angle 72 and a positive radial rake angle 78. When rotating in the clockwise direction, the deburring guide surfaces 64 provides an apparent radial relief angle since the hole 22 is larger than the workpiece engaging portion 34. The workpiece engaging portion 34 and the deburring guide surfaces 64 act as a guide, reducing the need for the operator to control the location of the cutting and deburring tool 20 while deburring the workpiece 24. The cutting and deburring tool 20 is moved orbitally relative to the workpiece 24 until the sharp edges and/or burrs are removed from the forward edge 22b of the hole 22 around the entire circumference of the hole 22. Alternatively, the cutting and deburring tool 20 can be moved along an edge of a workpiece 24 to remove sharp edges and/or burrs from the edge of a workpiece 24.

Alternatively, the workpiece engaging portion 34 is pressed against the inside edge 22c of the hole 22 of the workpiece 24 while the cutting and deburring tool 20 is rotating in the counter-clockwise direction relative to the workpiece 24. As the cutting and deburring tool 20 rotates in the counter-clockwise direction, the second deburring cutting edge 62 on each body section 42 repeatedly engages with the forward edge 22b of the hole 22 in the workpiece 24 to deburr the forward edge 22b of the hole 22 by cutting away the sharp edges and/or burrs while spinning against the workpiece 24, and the second deburring cutting edge 162 on each body section 142 repeatedly engages with the rearward edge 22a of the hole 22 in the workpiece 24 to deburr the rearward edge 22a of the hole 22 by cutting away the sharp edges and/or burrs while spinning against the workpiece 24. When rotating in the counter-clockwise direction, the second deburring cutting edges 62 provide a positive axial rake angle 82 and a positive radial rake angle 86, and the second deburring cutting edges 162 provide a positive axial rake angle 82 and a positive radial rake angle 86. When rotating in the counter-clockwise direction, the deburring guide surfaces 64 provides an apparent radial relief angle since the hole 22 is larger than the workpiece engaging portion 34. The workpiece engaging portion 34 and the deburring guide surfaces 64 act as a guide, reducing the need for the operator to control the location of the cutting and deburring tool 20 while deburring the workpiece 24. The cutting and deburring tool 20 is moved orbitally relative to the workpiece 24 until the sharp edges and/or burrs are removed from the forward edge 22b of the hole 22 around the entire circumference of the hole 22. Alternatively, the cutting and deburring tool 20 can be moved along an edge of a workpiece 24 to remove sharp edges and/or burrs from the edge of a workpiece 24.

In an embodiment, the rear body portion 132 is eliminated and the shaft 36 extends from the workpiece engaging portion 34. When the rear body portion 132 is eliminated, only the forward edge 22b of the hole 22 of the workpiece 24 is deburred.

While dimensions for various aspects of the cutting and deburring tool 20 are described, it is to be understood that other dimensions can be used without departing from the scope of the invention.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A cutting and deburring tool comprising:
a front end, a rear end, a length defined between the front and rear ends, and a central axis defined therebetween around which the cutting and deburring tool is configured to be rotated;
a tip at the front end;
a body portion extending from the tip, the body portion having a flute having first and second flute edges extending along the body portion thereby forming a body section, one of the flute edges being configured to cut a hole in the workpiece,
the flute further comprising first and second deburring cutting edges extending from rear ends of the flute edges and a deburring guide surface extending between the first and second deburring cutting edges, the deburring cutting edges extending in a generally axial direction and being configured to deburr a first edge of the hole of the workpiece;
a workpiece engaging portion comprising a cylindrical portion extending rearwardly directly from the deburring guide surface; and
a shank extending from the workpiece engaging portion.

2. The cutting and deburring tool of claim 1, wherein the deburring guide surface is angled relative to the central axis at an angle of approximately 110 degrees to approximately 130 degrees.

3. The cutting and deburring tool of claim 1, wherein the body section includes a plurality of steps.

4. A cutting and deburring tool comprising:
a front end, a rear end, a length defined between the front and rear ends, and a central axis defined therebetween around which the cutting and deburring tool is configured to be rotated;
a tip at the front end;
a body portion extending from the tip, the body portion having a flute having first and second flute edges extending along the body portion thereby forming a body section, one of the flute edges being configured to cut a hole in the workpiece,
the flute further comprising first and second deburring cutting edges extending from rear ends of the flute edges and a deburring guide surface extending between the first and second deburring cutting edges, the deburring cutting edges extending in a generally axial direction and being configured to deburr a first edge of the hole of the workpiece;
a workpiece engaging portion extending rearwardly of the body portion;
a shank extending from the workpiece engaging portion; and
a rear body portion provided between the workpiece engaging portion and the shank, the rear body portion including first and second deburring cutting edges separated from each other by a flute and a deburring guide surface extending between the first and second deburring cutting edges of the rear body portion, the deburring cutting edges of the rear body portion extending in a generally axial direction and being configured to deburr a second edge of the hole of the workpiece.

5. The cutting and deburring tool of claim 4, wherein the flute of the rear body portion aligns with the flute of the first defined body portion.

6. The cutting and deburring tool of claim 4, wherein the workpiece engaging portion comprises a cylindrical portion.

7. The cutting and deburring tool of claim 6, wherein the workpiece engaging portion further comprises a flat which is aligned with the flute of the body portion.

8. The cutting and deburring tool of claim 1,
wherein each flute edge is defined by a radial rake angle,
the first deburring cutting edge is defined by an axial rake angle and a radial rake angle,
the radial rake angle of the first flute edge is constant along the length of the flute and is the same as the radial rake angle of the first deburring cutting edge,
the second deburring cutting edge is defined by an axial rake angle and a radial rake angle,
the radial rake angle of the second flute edge is constant along the length of the flute and is the same as the radial rake angle of the second deburring cutting edge.

9. A cutting and deburring tool comprising:
a front end, a rear end, a length defined between the front and rear ends, and a central axis defined therebetween around which the cutting and deburring tool is configured to be rotated;
a tip at the front end;
a body portion extending from the tip, the body portion having a flute having first and second flute edges extending along the body portion thereby forming a body section, one of the flute edges being configured to cut a hole in the workpiece,
the flute further comprising first and second deburring cutting edges extending from rear ends of the flute edges and a deburring guide surface extending between the first and second deburring cutting edges, the deburring cutting edges extending in a generally axial direction and being configured to deburr a first edge of the hole of the workpiece;
a workpiece engaging portion extending rearwardly of the body portion; and
a shank extending from the workpiece engaging portion, wherein each flute edge is defined by a radial rake angle,
the first deburring cutting edge is defined by an axial rake angle and a radial rake angle,
the radial rake angle of the first flute edge is constant along the length of the flute and is the same as the radial rake angle of the first deburring cutting edge,
the second deburring cutting edge is defined by an axial rake angle and a radial rake angle,
the radial rake angle of the second flute edge is constant along the length of the flute and is the same as the radial rake angle of the second deburring cutting edge, and
wherein the radial rake angle defining the first flute edge and the first deburring cutting edge is different than the radial rake angle defining the second flute edge and the second deburring cutting edge.

10. A cutting and deburring tool comprising:
a front end, a rear end, a length defined between the front and rear ends, and a central axis defined therebetween around which the cutting and deburring tool is configured to be rotated;
a tip at the front end;
a body portion extending from the tip, the body portion having a flute having first and second flute edges extending along the body portion thereby forming a body section, one of the flute edges being configured to cut a hole in the workpiece,
the flute further comprising first and second deburring cutting edges extending from rear ends of the flute edges and a deburring guide surface extending between the first and second deburring cutting edges, the deburring cutting edges extending in a generally axial direction and being configured to deburr a first edge of the hole of the workpiece;
a workpiece engaging portion extending rearwardly of the body portion; and
a shank extending from the workpiece engaging portion, wherein each flute edge is defined by a radial rake angle,
the first deburring cutting edge is defined by an axial rake angle and a radial rake angle,
the radial rake angle of the first flute edge is constant along the length of the flute and is the same as the radial rake angle of the first deburring cutting edge,
the second deburring cutting edge is defined by an axial rake angle and a radial rake angle,
the radial rake angle of the second flute edge is constant along the length of the flute and is the same as the radial rake angle of the second deburring cutting edge, and
wherein the radial rake angle defining the first flute edge and the first deburring cutting edge is between approximately 10 degrees and approximately 35 degrees, and the radial rake angle defining the second flute edge and the second deburring cutting edge is between approximately 10 degrees and approximately 30 degrees.

11. The cutting and deburring tool of claim 10, wherein the axial rake angle of each deburring cutting edge is between approximately 20 degrees and approximately 60 degrees.

12. The cutting and deburring tool of claim 9, wherein the axial rake angle of each deburring cutting edge is between approximately 20 degrees and approximately 60 degrees.

13. A cutting and deburring tool comprising:
a front end, a rear end, a length defined between the front and rear ends, and a central axis defined therebetween around which the cutting and deburring tool is configured to be rotated;
a tip at the front end;
a body portion extending from the tip, the body portion having a flute having first and second flute edges extending along the body portion thereby forming a body section, one of the flute edges being configured to cut a hole in the workpiece,
the flute further comprising first and second deburring cutting edges extending from rear ends of the flute edges and a deburring guide surface extending between the first and second deburring cutting edges, the deburring cutting edges extending in a generally axial direction and being configured to deburr a first edge of the hole of the workpiece;
a workpiece engaging portion extending rearwardly of the body portion; and
a shank extending from the workpiece engaging portion, wherein the first deburring cutting edge is defined by an axial rake angle and a radial rake angle, the second deburring cutting edge is defined by an axial rake angle and a radial rake angle, the axial rake angle of the deburring cutting edges is between approximately 20 degrees and approximately 60 degrees, the radial rake angle defining the first deburring cutting edge is between approximately 10 degrees and approximately 35 degrees, and the radial rake angle defining the second deburring cutting edge is between approximately 10 degrees and approximately 30 degrees.

14. The cutting and deburring tool of claim 13, further comprising a rear body portion provided between the workpiece engaging portion and the shank, the rear body portion including first and second deburring cutting edges separated from each other by a flute and a deburring guide surface extending between the first and second deburring cutting edges of the rear body portion, the deburring cutting edges of the rear body portion extending in a generally axial direction and being configured to deburr a second edge of the hole of the workpiece.

15. The cutting and deburring tool of claim 14, wherein the deburring guide surface of the first defined body section is angled relative to the central axis at an angle of approximately 110 degrees to approximately 130 degrees, and the deburring guide surface of the rear body portion is angled relative to the central axis at an angle of approximately 46 degrees to approximately 70 degrees.

16. The cutting and deburring tool of claim 1, further comprising a rear body portion provided between the workpiece engaging portion and the shank, the rear body portion including first and second deburring cutting edges separated from each other by a flute and a deburring guide surface extending between the first and second deburring cutting edges of the rear body portion, the deburring cutting edges of the rear body portion extending in a generally axial direction and being configured to deburr a second edge of the hole of the workpiece.

17. The cutting and deburring tool of claim 1, wherein at least two flutes are provided.

18. The cutting and deburring tool of claim 16, wherein the first deburring cutting edge of the first defined body portion is defined by an axial rake angle and a radial rake angle, the second deburring cutting edge of the first defined body portion is defined by an axial rake angle and a radial rake angle, the axial rake angle of the deburring cutting edges of the first defined body portion is between approximately 20 degrees and approximately 60 degrees, and the radial rake angle of the deburring cutting edges of the first defined body portion is between approximately 10 degrees and approximately 35 degree; and wherein the first deburring cutting edge of the rear body portion is defined by an axial rake angle and a radial rake angle, the second deburring cutting edge of the rear body portion is defined by an axial rake angle and a radial rake angle, the axial rake angle of the deburring cutting edges of the rear body portion is between approximately 20 degrees and approximately 60 degrees, and the radial rake angle of the deburring cutting edges of the rear body portion is between approximately 10 degrees and approximately 35 degrees.

19. The cutting and deburring tool of claim 16, wherein the first defined deburring guide surface is angled relative to the central axis at an angle of approximately 110 degrees to approximately 130 degrees.

20. The cutting and deburring tool of claim 16, wherein the deburring guide surface of the first defined body section is angled relative to the central axis at an angle of approximately 110 degrees to approximately 130 degrees, and the deburring guide surface of the rear body portion is angled relative to the central axis at an angle of approximately 46 degrees to approximately 70 degrees.

21. The cutting and deburring tool of claim 16, wherein the body section includes a plurality of steps.

22. The cutting and deburring tool of claim 1, wherein the workpiece engaging portion further comprises a flat which is aligned with the flute of the body portion and interrupts the cylindrical portion.

* * * * *